United States Patent [19]

Berger et al.

[11] Patent Number: 4,759,529
[45] Date of Patent: Jul. 26, 1988

[54] PRE-LOADED VALVE FOLLOWER SEALING APPARATUS

[75] Inventors: John Berger; Jack Rollins, both of Muncie, Ind.

[73] Assignee: Maxon Corporation, Muncie, Ind.

[21] Appl. No.: 51,714

[22] Filed: May 20, 1987

[51] Int. Cl.[4] ............................................. F16K 3/20
[52] U.S. Cl. .................................... 251/328; 251/174
[58] Field of Search ................ 251/171, 174, 328, 329

[56] References Cited

U.S. PATENT DOCUMENTS

| | | | |
|---|---|---|---|
| 2,777,664 | 1/1957 | Bryant | 251/174 |
| 3,164,363 | 1/1965 | Williams | 251/329 X |
| 3,353,784 | 11/1967 | Grove | 251/328 X |
| 4,113,233 | 9/1978 | Bond | 251/328 |
| 4,124,194 | 11/1978 | Alvarez | 251/328 X |
| 4,479,670 | 10/1984 | Gabler | 251/174 |
| 4,483,511 | 11/1984 | Koshida | 251/172 X |

FOREIGN PATENT DOCUMENTS

| | | | |
|---|---|---|---|
| 1121423 | 1/1962 | Fed. Rep. of Germany | 251/328 |
| 85886 | 8/1957 | Netherlands | 251/328 |

*Primary Examiner*—A. Michael Chambers
*Assistant Examiner*—John C. Fox
*Attorney, Agent, or Firm*—Robert M. Ward

[57] ABSTRACT

The improved pre-loaded valve follower sealing apparatus comprises a follower ring and flange insert assembly. The assembly includes a pair of hollow cylinders compressively containing a follower preload and sealing element. That follower preload and sealing element is substantially annular in shape, but has an interior fluid contacting surface which is concave in transverse cross-section when not under compression, but which is rendered substantially smoothly cylindrical when placed under compression.

30 Claims, 4 Drawing Sheets

PRE-LOADED VALVE FOLLOWER SEALING APPARATUS

BACKGROUND OF THE INVENTION

The present invention is general related to valve sealing apparatus, and more particularly to a pre-loaded valve follower sealing apparatus for preventing contamination of the interior portions of a valve.

In the prior art, guillotine valve structures are well-known. Additionally, in valves of this type valve follower elements have been provided. Such valve follower elements have included a spring element in order to urge the valve follower ring into contact with the valve guillotine, thereby to maintain the "squeeze" upon the valve guillotine respectively by means of the follower ring and the oppositely disposed valve seat. The net result has been to substantially prevent leakage into the interior of the valve by the fluid material being transmitted through the valve.

Structures for accomplishing the above purposes have been in some instances generally functional in prior art mechanisms, but have had a number of disadvantages associated therewith. Specifically, some valve follower urging mechanisms have been unduly complicated and expensive to produce, as well as having introduced maintenance difficulties which have further increased the cost of utilizing such valve structures. Moreover, other valve follower urging elements have introduced undesirable turbulence within the flow of fluid material through the valve, which has further diminished the utility of such devices. Also, difficulty of servicing such valves has been a further complication in regard to prior art devices.

In view of the assorted difficulties and deficiencies of prior art valve follower and related apparatus, it is a material object of the pre-loaded valve follower sealing apparatus of the present invention to ameliorate such difficulties.

These and other objects of the present invention will become more apparent to the person of ordinary skill in the art upon review of the following summary of the invention, brief description of the drawing, detailed description of preferred embodiments, accompanying drawing and appended claims.

SUMMARY OF THE INVENTION

The improved pre-loaded valve follower sealing apparatus of the present invention is directed to various improvements in certain apparatus for use in connection with a valve seat disposed within a valve body and in contact with a valve guillotine. The valve guillotine is supported for reciprocal movement within the valve body. An assembly comprising a valve follower ring and flange insert is provided thereto. The valve follower ring and flange insert assembly includes a pair of hollow cylinders, one of which is snugly and slidingly disposed within the other, thereby to form a follower preload and sealing element containing space therebetween.

A follower preload and sealing element of special shape and dimensions is disposed within the follower preload and sealing element containing space formed by the interdisposed cylinders. Compression is provided to the follower preload and sealing element to urge the valve follower ring and thereby to pre-load the valve follower ring against the valve guillotine, and to do so in order to maintain a wear-compensating seal between the valve follower ring and the guillotine on the one side, and the guillotine and the valve seat on the opposite side.

In preferred embodiments, the follower pre-load and sealing element includes an interior surface which is concave in transverse cross-section when in a non-compressed state, but when disposed under a compressive pressure as in actual use, the interior surface becomes essentially smoothly cylindrical. The result of the use of such a compressed concave follower preload and sealing element is to provide a smooth surface, materially to reduce turbulence within the valve structure.

BRIEF DESCRIPTION OF THE DRAWING

The improved pre-loaded valve follower sealing apparatus of the present invention is depicted in the drawing, and in which.

DETAILED DESCRIPTION OF PREFERRED EMBODIMENTS

The improved pre-loaded valve follower sealing apparatus of the present invention functions to prevent contamination of the interior portions of a valve body while substantially maintaining functionality of flow of the transmitted material within the valve. The valve body element of the improved pre-loaded valve follower sealing apparatus of the present invention is of the type including a valve guillotine which is supportingly disposed for reciprocating longitudinal movement within such valve body. The valve body further has attached to it an inlet flange and an outlet flange which are oppositely disposed upon the exterior of the valve body.

A valve seat is disposed within the valve body and sealingly is connected to either one of the inlet or outlet flanges to open thereinto. A valve follower ring and flange insert assembly is further included, and comprises a pair of hollow cylindrical-shaped elements, one of which is snugly and slidingly interdisposed within the other. One of such cylinders has a shoulder of reduced diameter on the inner diameter thereof to form an follower preload and sealing element containing space together with the top extremity of the other cylinder. A follower pre-load and sealing element is disposed within the follower preload and sealing element containing space formed by the interdisposed cylinders. Force directing means are also provided for simultaneously sealing the interior of the valve body from fluid leakage through the interdisposed cylinders and for applying force in the direction of the guillotine upon the follower preload and sealing element. Such force is thereby directed upon and to the valve follower ring to pre-load the valve follower ring against the guillotine. Thus, a fluid sealing element is maintained between the guillotine and the valve follower ring on one side of the guillotine, and between the guillotine and the valve seat on the opposite side of the guillotine.

In preferred embodiments of the improved pre-loaded valve follower sealing mechanism of the present invention, the follower preload and sealing element is substantially annular in shape, but includes an inner surface thereof which is concave in transverse cross-section when in the uncompressed state, and which is rendered substantially smoothly cylindrical when disposed under the compressive pressure of the pre-load conditions within the follower preload and sealing element containing space. Such preferred embodiments of the improved pre-loaded valve follower sealing mechanism of the present invention may preferably include an follower preload and sealing element which further includes an annular-shaped groove. Such annular shaped groove is circumferentially disposed in the exterior diameter of the follower preload and sealing element for facilitating formation of the substantially smooth cylindrical shape to the interior surface of the follower preload and sealing element during the application of compressive pressure thereonto, as in actual use.

The pair of interdisposed cylinders comprising the follower ring and flange insert assembly may be substantially L-shaped in transverse cross-sectional view.

The annular-shaped groove in the exterior radial surface of the follower preload and sealing element may preferably be substantially rectangular in transverse cross-section, although other alternative cross-sectional shapes are contemplated in the invention hereof.

The valve seat of the improved valve sealing mechanism of the present invention may preferably include an annular-shaped lip portion of larger diameter than the respective valve body opening to which it is sealingly connected, to form a circumferential seal around the respective valve body opening.

The flange insert of the improved valve sealing mechanism of the present invention may preferably include an annular-shaped lip portion of larger diameter than the respective valve body opening to which it is sealingly connected, thereby to form a circumferential seal around the respective valve body opening.

In such preferred embodiments, a gasket may be preferably disposed between a portion of the respective annular shaped lip portion and the valve body around the respective valve body opening.

Figure 1:
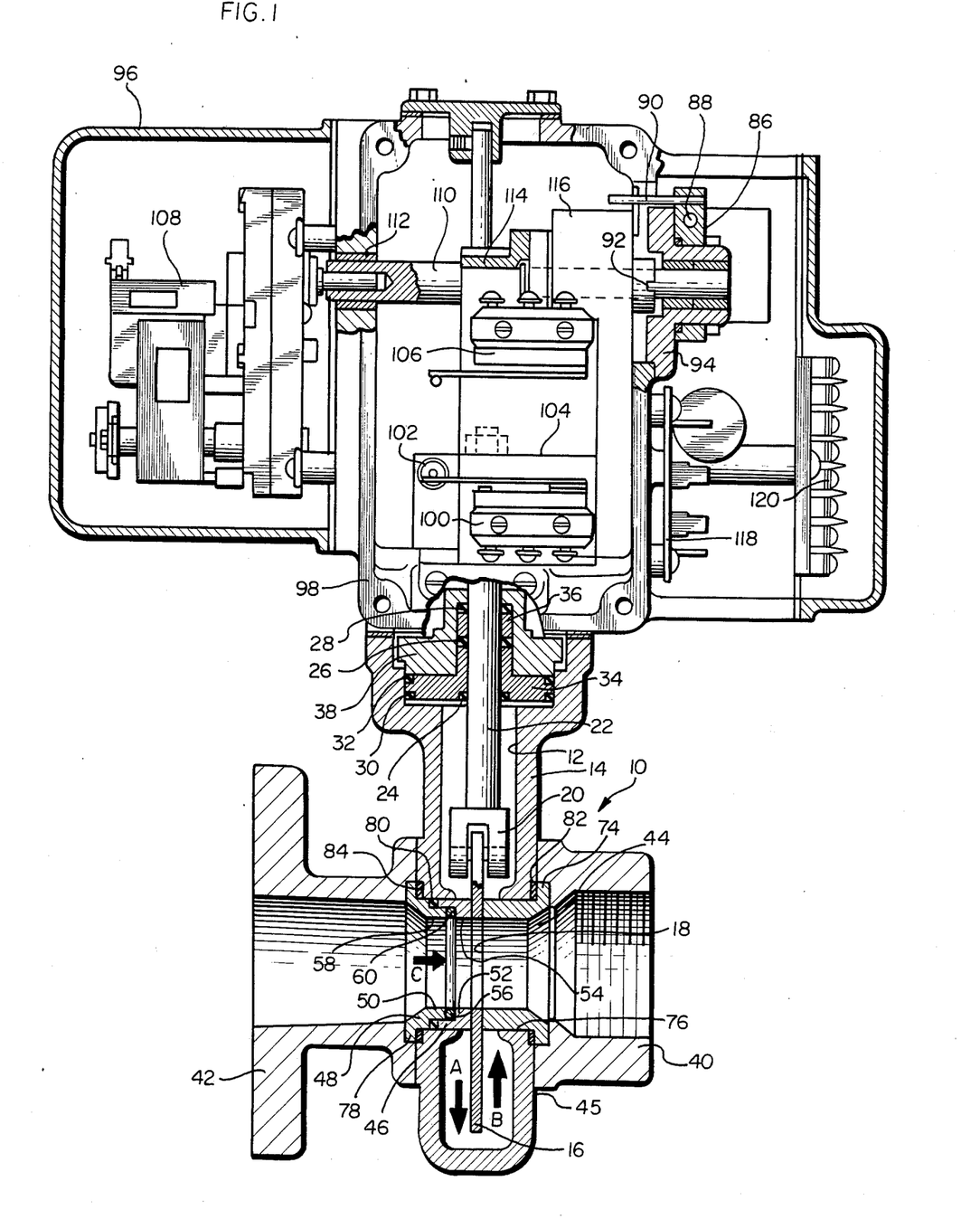
FIG. 1 is a cross-sectional view of the improved pre-loaded valve follower sealing apparatus of the present invention disposed upon a valve body, and also further showing a cross-sectional view through the inlet and outlet flange of the valve structure, and yet further showing an improved wear compensating stem sealing apparatus, which is the subject of a separate patent application.

Referring now to the drawing and to the embodiment depicted in FIG. 1 in particular, the improved pre-loaded valve follower sealing apparatus of the present invention is depicted generally at 10. Valve follower sealing apparatus 10 functions to prevent contamination of the interior portions 12 of a valve body 14. Valve body 14 of the improved pre-loaded valve follower sealing apparatus 10 is of the type including a valve guillotine 16 having a fluid transmitting opening 18 therein. Guillotine 16 is supportingly disposed for reciprocating longitudinal movement within valve body 14 as shown at arrows A,B by means of yoke 20 from valve stem 22. Valve stem 22 may be further sealed from permitting fluid or other contamination from traveling upwardly thereon by means of a wiper O-ring 24, and wear compensating O-rings 26,28, as well as exterior O-rings 30,32 which are disposed at the exterior diameter of O-ring separator 34. Stem ring 36 separates wear compensating O-rings 26,28 and which are secured about stem 22 by means of bonnet 38. As used herein, the term "O-ring" is meant to include various forms of annular sealing elements, having various cross-sectional shapes and elements. Two such alternative forms are the Bal Seal by Bal Seal Engineering Company, Inc. of Santa Ana, Calif. and the extended range hydraulic seals produced by Microdot Company of Salt Lake City, Utah.

Valve body 14 further has attached to it on opposite sides thereof inlet flange 40 and outlet flange 42, which are oppositely disposed upon exterior 45 of valve body 14. Such flanges 40,42 may be either threaded, as shown herein, or non-threaded, as shown in the alternative embodiment of FIG. 4, infra, and either of flanges 40,42 may be the inlet or outlet flange.

A valve seat 44 is disposed within valve body 14 and sealingly is connected to either one of the inlet or outlet flanges 40,42 to open thereinto. Valve follower ring 46 and flange insert 48 form an assembly 50, which comprises a pair of hollow cylindrical-shaped elements, one of which is snugly and slidingly interdisposed within the other. One of such cylinders (here follower ring 46) has a shoulder 52 of reduced diameter on the inner diameter 54 thereof to form a follower preload and sealing element containing space 56 together with the top extremity 58 of the other cylinder (here flange insert 48).

A follower preload and sealing element 60 is disposed within the follower preload and sealing element containing space 56 formed by the interdisposed cylinders 46,48. A force directing means is also provided for simultaneously sealing the interior of valve body 14 from fluid leakage through interdisposed cylinders 46,48 and for applying force in the direction of guillotine 16 upon follower preload and sealing element 60. Such force is thereby directed upon and to valve follower ring 46 to pre-load valve follower ring 46 against guillotine 16 (See Arrow C). Thus, a fluid sealing element is maintained between guillotine 16 and valve follower ring 46 on one side of guillotine 16, and the valve seat 44 on the opposite side of guillotine 16.

Figure 2:
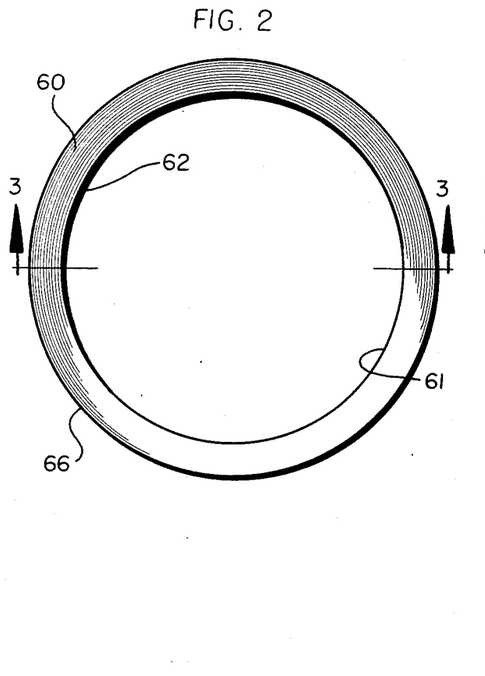
FIG. 2 is an enlarged top view of a preferred embodiment of a follower preload and sealing element suitable for use in practicing the present invention.
Figure 3:
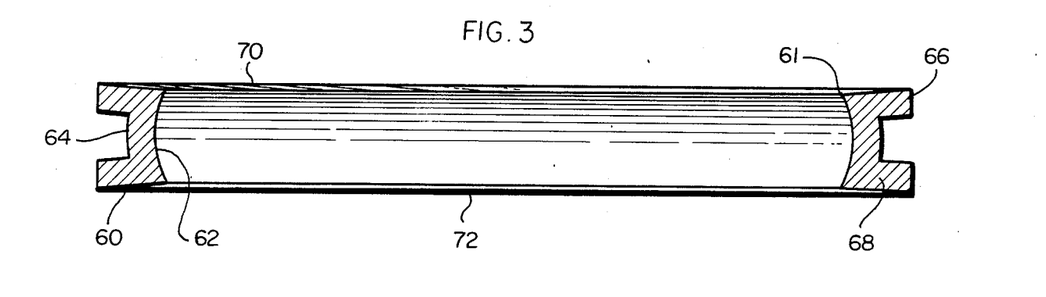
FIG. 3 is an enlarged transverse cross-sectional view of the follower preload and sealing element of FIG. 2 taken along lines 3—3 of FIG. 2 for use in the pre-loaded valve follower sealing apparatus of the present invention, such follower preload and sealing element having a substantially annular shape, but with the interior surface thereof being concave in transverse cross-section in the uncompressed state (as shown)

As shown more particularly in FIGS. 2 and 3, in preferred embodiments of the improved pre-loaded valve follower sealing apparatus 10 of the present invention, follower preload and sealing element 60 is substantially annular in shape, but in certain preferred embodiments includes an interior surface 62 thereof which is concave in transverse cross-section when in the uncompressed state, and which is rendered substantially smoothly cylindrical when disposed under the compressive pressure of the pre-load conditions within follower preload and sealing element containing space 56 as shown in FIG. 1. Such concave curve may be of the range of approximately 0.41R in one embodiment. Such radius R may vary depending upon the diameter of the valve channel, and the width of the follower preload and sealing element containing space.

Such preferred embodiments of improved pre-loaded valve follower sealing mechanism 10 of the present invention may preferably include a follower preload and sealing element 60 which further includes an annular-shaped groove 64. Such annular shaped groove 64 is circumferentially disposed in the exterior diameter 66 of follower preload and sealing element 60 for facilitating the substantially smoothly cylindrical shape to interior surface 62 of follower preload and sealing element 60 during the application of compressive pressure thereonto, as in actual use. As shown in FIG. 3, annular shaped radial groove 64 may comprise approximately 35% of the transverse thickness 68 of follower preload and sealing element 60, although other sizes of such groove will remain functional. In some preferred embodiments, the transverse thickness 68 of follower preload and sealing element 60 comprises approximately 13% of the interior diameter 61 of follower preload and sealing element 60, and approximately 11% of the exterior diameter 66 of follower preload and sealing element 60, although thicker or thinner elements 60 are contemplated in other embodiments, as well as follower preload and sealing element having a relatively smaller central aperture. Such follower preload and sealing element 60 has lateral top and bottom surfaces 70,72 which radially extend from exterior diameter 66 of follower preload and sealing element 10 to the interior diameter 61 of follower preload and sealing element 60 at an angle of approximately 2%, although other angles are likewise contemplated for use herein.

The pair of interdisposed cylinders comprising the follower ring 46 and flange insert 48 assembly may be substantially L-shaped in transverse cross-sectional view, as shown in FIG. 1.

Annular-shaped groove 64 in the exterior radial surface at exterior diameter 66 of follower preload and sealing element 60 may preferably be substantially rectangular in transverse cross-sectional shape in some embodiments although a wide variety of other alternative cross-sectional shapes is contemplated in the invention hereof.

Valve seat 44 of improved valve sealing mechanism 10 of the present invention may preferably include an annular-shaped lip portion 74 of larger diameter than respective valve body opening 76 to which it is sealingly connected, to form a circumferential seal around the respective valve body opening 76. Correspondingly, flange insert 48 of improved valve sealing apparatus of the present invention may preferably include an annular-shaped lip portion 78 of larger diameter than the respective valve body opening 80 to which it is sealingly connected, thereby to form a circumferential seal around respective valve body opening 80.

In such preferred embodiments, gaskets 82,84 may be preferably disposed between a portion of the respective annular shaped lip portion 74,78 and the valve body 14 around the respective valve body openings 76,78 thereof.

An alternative preferred embodiment of the sealing apparatus 210 of the present invention is shown in FIGS. 4–7. Therein, elements common to embodiments depicted in FIGS. 1–3, supra, are generally designated with the same number plus 200.

Figure 4:
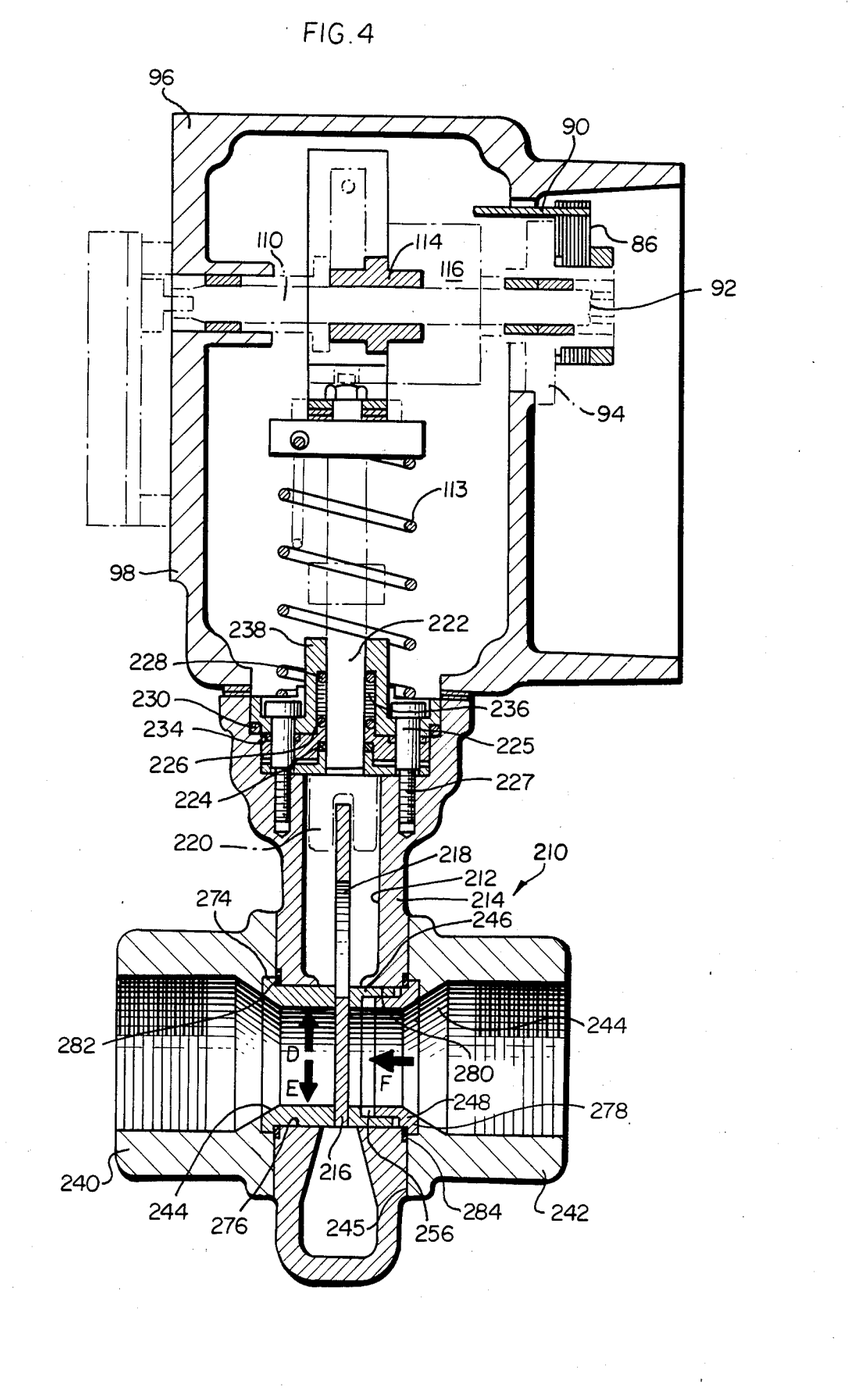
FIG. 4 is a cross-sectional view of an alternative embodiment of the improved pre-loaded valve follower sealing apparatus of the present invention disposed upon a valve body, and further showing such separatable cross-sectional view through the inlet and outlet flange of the valve structure, and yet further showing an improved wear compensating stem sealing apparatus, which is the subject of a separate patent application.
Figures 5, 6, 7:
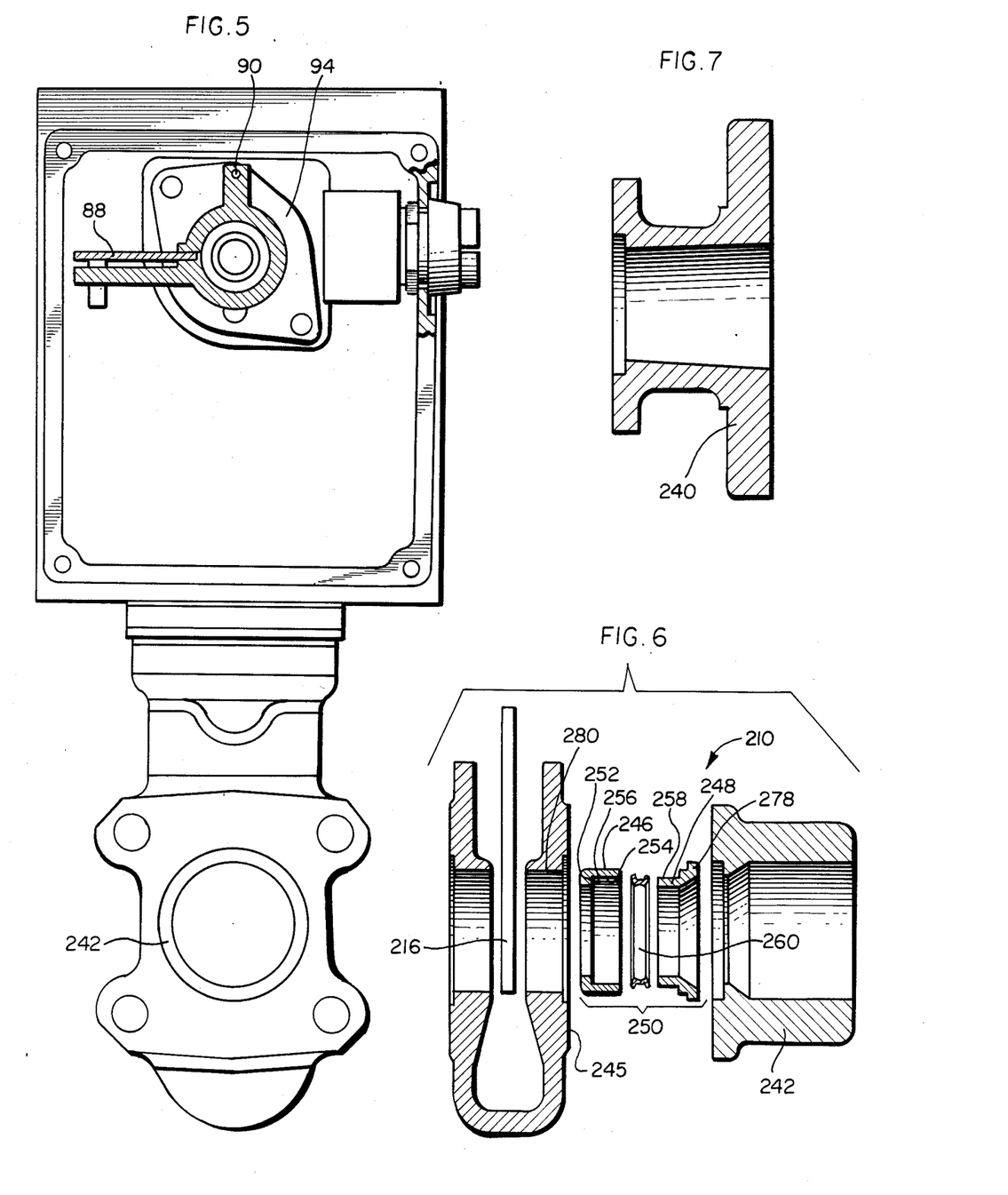
FIG. 5 is a view from the right-side end of the valve body as shown in the alternative embodiment of FIG. 4 hereof and shown in partial cross-section.
FIG. 6 is an exploded cross-sectional view showing the elements of the improved pre-loaded valve follower sealing apparatus alternative embodiment as shown in FIGS. 4-5 hereinabove.
FIG. 7 is a cross-sectional view of one flange of the improved pre-loaded valve follower sealing apparatus of the present invention as shown in FIGS. 4-6 hereinabove.

A further embodiment of the improved pre-loaded valve follower sealing apparatus of the present invention is depicted generally at 210 in FIG. 4 or in FIG. 6. Therein, valve follower sealing apparatus 210 also functions to prevent contamination of the interior portions 212 of valve body 214, as set forth with prior embodiments. Valve body 214 of the improved pre-loaded valve follower sealing apparatus 210 is also of the type including a valve guillotine 216 having a fluid transmission opening 218 therein. Guillotine 216 is supportingly disposed for reciprocating longitudinal movement within valve body 214 as shown at Arrows D,E by means of yoke 220 from valve stem 222. Valve stem 222 may be futher sealed from preventing liquid or other contamination from traveling upwardly thereon by means of a wiper O-ring 224, and wear compensating rings 226,228, as well as exterior O-ring 230 which is disposed at the exterior diameter of O-ring separator 234. Stem ring 236 separates were compensating O-rings 226,228 and which are secured about stem 222 by means of bonnet 238. Various alternative arrangements of such, O-rings may be utilized in the various alternative embodiments hereof.

As used herein also in reference to the embodiments of FIGS. 4–7, the term "O-ring" is meant to include various forms of annular sealing elements having various cross-sectional shapes and elements, such as are described hereinabove in connection with FIGS. 1-3 hereof.

Valve body 214 further has attached to it on opposite sides thereof inlet flange 240 and outlet flange 242 which are oppositely disposed upon exterior 245 valve body 214. Such flanges 240,242 may be either threaded or non-threaded, and either of flanges 240,242 may be the inlet or outlet flange, as set forth hereinabove in connection with the description of FIGS. 1-3 hereof.

In the embodiment shown in FIG. 4, through Bolts 225 including threaded portions 227 thereof may be provided to interconnect bonnet 238 with O-ring separator 234 and secure same to valve body 214, as shown particularly in FIG. 4.

A valve seat 224 is disposed within valve body 214 and sealingly is connected to either one of the inlet or outlet flanges 240, 242 to open thereinto. Valve follower ring 246 and flange insert 248 may preferably form an assembly 250 which comprises a pair of hollow cylindrical shape elements, one of which is snugly and slidingly interdisposed within the other, as best shown in the exploded rendition of FIG. 6. One of such cylinders (here, follower ring 246) has a shoulder 252 of reduced diameter on the inner diameter 254 thereof to form a follower pre-load and sealing element containing space 256 together with the top extremity 258 of the other cylinder rear flange insert 248.

A follower pre-load and sealing element 260 is disposed within the follower pre-load and sealing element containing space 256 formed by the interdisposed cylinders 246,248. A force directing means is also provided for simultaneously sealing the interior of valve body 214 from fluid leakage through interdisposed cylinders 246,248 and for applying force in the direction of guillotine 216 upon follower pre-load and sealing element 260. Such force is thereby directed upon and to valve follower ring 246 to pre-load valve follower ring 246 against guillotine 216 (see Arrow F). Thus, a liquid sealing element is maintained between guillotine 216 and valve follower ring 246 on one side of guillotine 216, and valve seat 244 on the opposite side of guillotine 216.

Figure 8:
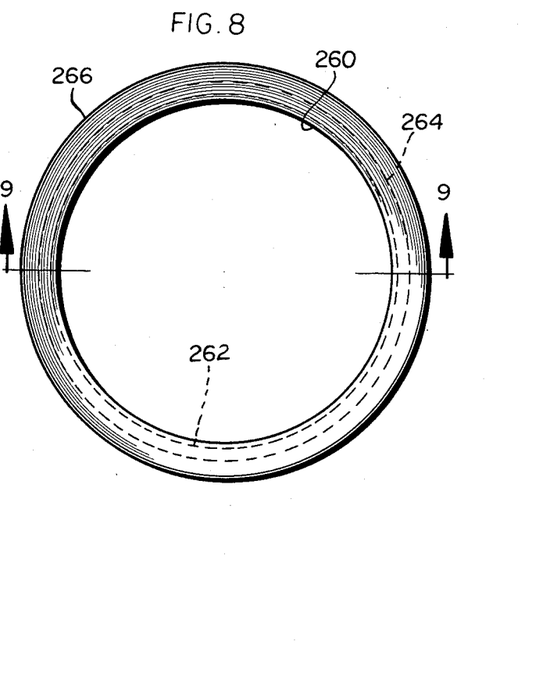
FIG. 8 is an enlarged top view of an alternative embodiment of a follower pre-load and sealing element.
Figure 9:
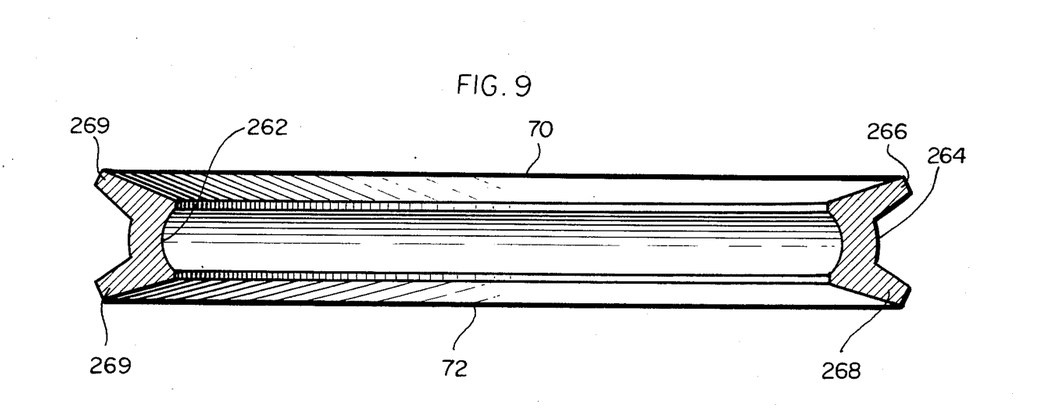
FIG. 9 is a transverse cross-sectional view of the follower pre-load and sealing element of FIG. 8 taken along lines 9—9 of FIG. 8, and somewhat similar to the embodiment depicted in FIGS. 2-3, supra.

As shown more particularly in FIGS. 8 and 9, and in preferred alternative embodiments of the improved pre-loaded valve follower sealing apparatus 10 of the present invention, an alternative form of a follower pre-loaded sealing element 260 is shown. Such element 260 is also generally annular in shape, and may include an anterior surface 262 thereof which is concave in transverse cross-section when in the uncompressed state, and which is to be rendered substantially smoothly cylindrical when disposed under the compressive pressure of the pre-load conditions within such follower pre-load and sealing element containing space 256 as shown in FIG. 4 hereof. Such concave curve may be of the range of approximately 0.100R in such alternative embodiment. As in the embodiment set forth hereinabove the radius R may vary depending upon the diameter of the valve channel, and the width of the follower pre-load and sealing element containing space 256.

Such preferred embodiments of the improved pre-loaded valve follower sealing mechanism 210 of the present invention may preferably include such follower pre-load and sealing element 260 which further includes a generally annular shaped groove 264. Such annular shaped groove 264 is circumferentially disposed in the exterior diameter 266 of element 260 for facilitating the substantially smoothly cylindrical shaped to exterior surface 262 of element 260 during the application of compressive pressure there onto, as in actual use. As shown in FIGS. 8-9, annular shaped radial groove 264 may comprise approximately more than 50% of the effective transverse thickness 268 of element 260 when in the compressed state, although other sizes of such groove will remain functional. In some preferred alternative embodiments, the transverse thickness 268 of element 260 comprises approximately 13.0% of the innerdiameter 261 of element 260, approximately 10.9% of the exterior diameter of element 260, and approximately 11.8% of the diameter at the bottom of radial groove 264, although thicker or thinner elements 260 are contemplated in other embodiments, as well as elements 260 having a relatively smaller central aperture.

Such element 260 has lateral top and bottom surfaces 270,272 which radially extend, and thus slope inwardly, from exterior diameter 266 of element 260 to the innerdiameter 261 of element 260 at an uninstalled exterior leg of approximately 15°, although other angles are likewise contemplated for use herein.

As setforth hereinabove in the embodiment of FIGS. 1-3, the pair of interdisposed cylinders comprising the follower ring 246 in flange insert 248 assembly 250 may be substantially L-shaped in a transverse cross-sectional view.

Annular shaped groove 264 in exterior radial surface 266 of element of 260 may preferably be substantially rhomboidal in transverse cross-sectional shape, although other alternative cross-sectional shapes are contemplated in the invention hereof. The non-parallel surfaces of such cross-sectional rhomboidal shape, as shown in FIG. 9, slope outwardly at an angle of approximately 38° to the plane of such element 260 to form a pair of outwardly extending legs 269 extending from element 260. When such element 260 is installed with in follower preload and sealing element containing space 256, the exterior leg angle is decreased from the approximately 15° to approximately 0°, as legs 269 are bent towards each other. When a compressive load as applied to such follows pre-load and sealing element containing space 256, in preferred embodiments the shape of element 260 and particularly the radiused inner diameter configuration thereof substantially prevents bulging of element 260 innerdiameter into the valve channel over an extended range of compressive forces. As with other embodiments described supra, valve seat 244 of improved valve sealing mechanism 210 of the present invention may preferably include an annular shaped lip portion 274 of larger diameter than respective valve body opening 276 to which it is sealingly connected, to form a circumferential seal around the respective valve body opening 276. Correspondingly, flange insert 248 of improved valve sealing apparatus of the present invention 210 may preferably include an annular shaped lip portion 278 of larger diameter than the respective valve body opening 280 to which it is sealingly connected, thereby to form a circumferential seal around respective valve body opening 280. In such preferred embodiments, gaskets 282,284 may be preferably disposed between the portion of the respective annular shaped lip portions 274,278 and the valve body 214 around the respective valve body openings 276,278 thereof.

Each of FIGS. 1, 4 and 5 depicts means for diagnosing difficulties with the valve. Therein, diagnostic switch actuator bracket 86 carries spring plunger carrier bar 88, clutch pin 90 and diagnostic switch actuator pin 92. This assembly rotates around clutch bearing housing 94. In usual operation, the spring plunger 88 has sufficient force to keep the assembly from moving when the valve is opened. When the valve becomes dirty and force above a threshold amount is required to open the valve, the force of the rotary motion of the clutch is transferred through the clutch pin 90 and diagnostic switch actuator bracket 92 to overcome the spring loaded spring plunger 88. The diagnostic switch actuator pin 92 is moved against the diagnostic switch (not shown), which energizes a signal indicating that the valve requires attention.

Also, as depicted in the upper portion of FIG. 1 and within operational housing 96 at main base 98 and supported thereby is valve open switch 100 having a switch actuator 102 and a spring retainer 104. Oppositely disposed is valve close switch 106. Motor 108 is shown driving pinion gear shaft 110 which is journaled in bearings 112, and drives pinion gear 114 and clutch 116. In the embodiment of FIG. 4, a counter vailingly disposed coil spring 113 is disposed for driving the valve into open configuration when power to the motor is interrupted. Also shown in FIG. 1 are 90 volt circuit board and time delay circuit board 118 and terminal strips 120. These latter parts of the valve mechanism as shown in FIGS. 1, 4 and 5 are not considered to be necessary parts per se of the present invention, as a wide variety of substitutions and different valve actuating and operating mechanisms may be utilized.

The basic and novel characteristics of the improved apparatus of the present invention will be readily understood from the foregoing disclosure by those skilled in the art. It will become readily apparent that various changes and modifications may be made in the construction and arrangement of the improved apparatus of the present invention as set forth hereinabove without departing from the spirit and scope of the invention. Accordingly, the preferred and alternative embodiments of the present invention set forth hereinabove are not intended to limit such spirit and scope in any way.

What is claimed is:

1. An improved pre-loaded valve follower sealing apparatus for preventing contamination of the interior portions of a valve, such sealing apparatus comprising:

a valve body having a valve guillotine supportingly disposed for reciprocating movement therein;

inlet flange and outlet flange means oppositely disposed upon the exterior of said valve body;

a valve seat disposed within said valve body and connected to one of said inlet and outlet flanges to open thereinto; and a follower ring and flange insert assembly adjacently disposed for forming a follower preload and sealing element containing space therebetween; said (a) follower ring and flange insert assembly comprising:

a pair of hollow cylinders, one of which is snugly and slidingly interdisposed within the other;

a follower preload and sealing element disposed within said follower preload and sealing element containing space formed by said interdisposed cylinders, said follower preload and sealing element being substantially annular in shape, but with the interior fluid contacting surface thereof being concave in transverse cross-section when not under compression to be rendered substantially smoothly cylindrical when disposed under the compressive pressure of said preload conditions within said follower preload and sealing element containing space, and to form a substantially smooth cylindrical surface within said valve to minimize turbulence of the fluid passing through said follower preload and sealing element and impinging upon said interior fluid contacting surface thereof; and force directing and sealing means for simultaneously sealing the interior of said valve body from fluid leakage through said interdisposed cylinders and for applying force in the direction of said guillotine upon said follower preload and sealing element, and thereby upon said follower ring, to preload said follower ring against said guillotine for maintaining liquid sealing between said guillotine and said follower ring on one side of said guillotine, and between said guillotine and said valve seat on the opposite side of said guillotine.

2. The improved valve sealing apparatus of claim 1 wherein said follower preload and sealing element further includes a generally annular-shaped groove circumferentially disposed in the exterior diameter thereof, and defining outwardly extending legs and for facilitating said substantially smoothly cylindrical shape to the interior surface thereof during compression by means of application of compressive pressure thereto within said follower pre-load and sealing element containing space.

3. The improved valve sealing apparatus of claim 2 wherein transverse cross-sectional shape of said annular-shaped groove is selected from the group consisting of substantially rectangular and rhomboidal.

4. The improved valve sealing apparatus of claim 2 wherein the transverse dimension of said annular shaped groove comprises approximately 35% of the transverse thickness of said follower preload and sealing element at the exterior circumferential surface thereof.

5. The improved valve sealing apparatus of claim 1 wherein said pair of interdisposed cylinders comprising said follower ring and flange insert assembly are substantially L-shaped in transverse cross-section.

6. The improved valve sealing apparatus of claim 1 wherein said valve seat includes an annular-shaped lip portion of larger diameter than said respective valve body opening to which it is sealingly connected to form a circumferential seal around said respective valve body opening.

7. The improved valve sealing apparatus of claim 6 further comprising a gasket disposed between a portion of said respective annular-shaped lip portion and said valve body around said respective valve body opening.

8. The improved valve sealing apparatus of claim 1 wherein said flange insert includes an annular-shaped lip portion of larger diameter than said respective valve body opening to which it is sealingly connected to form a circumferential seal around said respective valve body opening.

9. The improved valve sealing apparatus of claim 1 wherein said follower preload and sealing element is formed from an elastomeric material.

10. The improved valve sealing apparatus of claim 1 wherein said valve guillotine moves in a longitudinal direction within said valve body.

11. The improved valve sealing apparatus of claim 1 wherein said valve seat is sealingly connected to one of said inlet and outlet flanges.

12. The improved valve sealing apparatus of claim 1 wherein said follower preload and sealing element containing space is defined by said shoulder of one said interdisposed cylinder and the top extremity of said other interdisposed cylinder.

13. The improved valve sealing apparatus of claim 1 wherein said follower preload and sealing element concave interior surface has a curvature of approximately 0.41R where in the incompressed state.

14. The improved valve sealing apparatus of claim 1 wherein said follower preload and sealing element has lateral, top and bottom, surfaces which radially extend from the exterior diameter of the follower preload and sealing element to the interior diameter of the follower preload and sealing element at an angle of approximately 2° when in the uninstalled state.

15. The improved valve sealing apparatus of claim 1 wherein the transverse thickness of said follower preload and sealing element comprises approximately 13% of the interior diameter thereof.

16. The improved valve sealing apparatus of claim 1 wherein the transverse thickness of said follower preload and sealing element comprises approximately 11% of the exterior diameter thereof.

17. The improved valve sealing apparations of claim 1 wherein one said cylinder has a shoulder of reduced diameter on the inner diameter thereof.

18. In a valve having a valve body including a fluid flow passage through a guillotine which is disposed between a valve follower and a valve seat, the improvement comprising:

sealing and urging means disposed adjacent the valve follower and opposite the guillotine for urging the valve follower into contact with the guillotine and for simultaneously sealing the fluid flow passage within the valve from leakage of fluid into the valve body, said sealing and urging means including a follower preload and sealing statement which has a concave interior surface when in the uncompressed state but having an interior fluid contacting surface which is substantially smoothly cylindrical when in the compressed state; and means for exterting compressive force to said sealing and urging means at the lateral side thereof which is opposite engagement with the valve follower.

19. The improvement of claim 18 wherein said follower preload and sealing element includes a groove on the outer circumferential surface thereof.

20. The improved valve sealing apparatus of claim 19 wherein said annular groove of said follower preload and sealing element has a groove bottom and defines a pair of legs extending outwardly therefrom at an interior angle of approximately 38° to said groove bottom when in the uncompressed state.

21. The improved valve sealing apparatus of claim 20 wherein said outwardly extending legs are first bent towards each other within said follower preload and sealing element containing space.

22. The improved valve sealing apparatus of claim 21 wherein said follower preload and sealing element is thereafter compressed by application of compressive force within said follower preload and sealing element containing space upon said outwardly extending legs thereof.

23. The improved valve sealing apparatus of claim 22 wherein application of compressive force to said outwardly extending legs renders said interior radiused surface of said follower preload and sealing element substantially smoothly cylindrical in shape.

24. The improved valve sealing apparatus of claim 23 wherein said preload and sealing element interior radiused surface substantially resists bulging inwardly over an extended range of compressive forces within said follower preload and sealing element containing space.

25. The improvement of claim 18 wherein said groove is substantially rectangular in transverse cross-sectional shape.

26. The improvement of claim 18 wherein said groove is substantially rhomboidal in transverse cross-sectional shape.

27. The improved valve sealing apparatus of claim 18 wherein said follower preload and sealing element concave interior surface has a curvature of approximately 0.10R when in the uncompressed state.

28. The improved valve sealing apparatus of claim 18 wherein said follower preload and sealing element concave interior surface has a curvature of approximately 0.10R to approximately 0.41R when in the uncompressed state.

29. The improved valve sealing apparatus of claim 18 wherein said follower preload and sealing element has lateral top and bottom surfaces which radially extend from the exterior diameter of the follower preload and sealing element to the interior diameter thereof at an angle of approximately 15° when in the uninsstalled state.

30. The improved valve sealing apparatus of claim 18 wherein said follower preload and sealing element has lateral top and bottom surfaces which radially extend from the exterior diameter of the follower preload and sealing element to the interior diameter thereof at an angle of approximately 2° to approximately 15° when in the uninstalled state.

* * * * *